(12) United States Patent
Charbonneau et al.

(10) Patent No.: US 7,642,306 B2
(45) Date of Patent: Jan. 5, 2010

(54) CONTROL OF PH IN FORMALDEHYDE-FREE BINDER SYSTEMS

(75) Inventors: Mark William Charbonneau, Littleton, CO (US); Michael William Luka, Littleton, CO (US)

(73) Assignee: Johns Manville, Denver, CO (US)

( * ) Notice: Subject to any disclaimer, the term of this patent is extended or adjusted under 35 U.S.C. 154(b) by 512 days.

(21) Appl. No.: 10/877,653

(22) Filed: Jun. 25, 2004

(65) Prior Publication Data

US 2005/0288409 A1    Dec. 29, 2005

(51) Int. Cl.
*C08G 63/06* (2006.01)

(52) U.S. Cl. ........................... 524/284; 524/556

(58) Field of Classification Search ............ 524/284, 524/556

See application file for complete search history.

(56) References Cited

U.S. PATENT DOCUMENTS 6,071,994 A * 6/2000 Hummerich et al. ........ 524/247

* cited by examiner

*Primary Examiner*—Robert D. Harlan
(74) *Attorney, Agent, or Firm*—Robert D. Touslee

(57) ABSTRACT

A system for controlling the pH of a formaldehyde-free aqueous binder composition used in the manufacture of glass fiber products. Following the formation of an aqueous binder composition, acid is added to the composition to reduce the pH to less than about 3.4. After the acid is combined with the aqueous binder composition, the pH of the composition is measured and then compared within a pre-set set point. The rate of acid addition is then adjusted thereby adjusting the pH of the composition such that the measured pH equals the set point pH. The pH measurement is preferably done before the addition of other additives to avoid interference by those additives.

8 Claims, 1 Drawing Sheet

CONTROL OF PH IN FORMALDEHYDE-FREE BINDER SYSTEMS

TECHNICAL FIELD

The invention relates to a system for controlling the pH of formaldehyde-free binder systems used in the manufacture of glass fiber products. Maintaining a low pH during the preparation of the binder system, the application of the binder system to the glass fibers and subsequent curing process ensures proper curing of the binder system resulting in excellent recovery and rigidity properties.

BACKGROUND OF THE INVENTION

Fiberglass binders have a variety of uses ranging from stiffening applications where the binder is applied to woven or non-woven fiberglass sheet goods and cured, producing a stiffer product; thermo-forming applications wherein the binder resin is applied to sheet or lofty fibrous product following which it is dried and optionally B-staged to form an intermediate but yet curable product; and to fully cured systems such as building insulation.

Fibrous glass insulation products generally comprise matted glass fibers bonded together by a cured thermoset polymeric material. Molten streams of glass are drawn into fibers of random lengths and blown into a forming chamber where they are randomly deposited as a mat onto a traveling conveyor. The fibers, while in transit in the forming chamber and while still hot from the drawing operation, are sprayed with an aqueous binder. A phenol-formaldehyde binder is currently used throughout the fibrous glass insulation industry. The residual heat from the glass fibers and the flow of air through the fibrous mat during the forming operation are generally sufficient to volatilize the majority to all of the water from the binder, thereby leaving the remaining components of the binder on the fibers as a viscous or semi-viscous high solids liquid. The coated fibrous mat is transferred to a curing oven where heated air, for example, is blown through the mat to cure the binder and rigidly bond the glass fibers together.

Fiberglass binders used in the present sense should not be confused with matrix resins which are an entirely different and non-analogous field of art. While sometimes termed "binders", matrix resins act to fill the entire interstitial space between fibers, resulting in a dense, fiber reinforced product where the matrix must translate the fiber strength properties to the composite, whereas "binder resins" as used herein are not space-filling, but rather coat only the fibers, and particularly the junctions of fibers. Fiberglass binders also cannot be equated with paper or wood product "binders" where the adhesive properties are tailored to the chemical nature of the cellulosic substrates. Many such resins, e.g. urea/formaldehyde and resorcinol/formaldehyde resins, are not suitable for use as fiberglass binders. One skilled in the art of fiberglass binders would not look to cellulosic binders to solve any of the known problems associated with fiberglass binders.

Binders useful in fiberglass insulation products generally require a low viscosity in the uncured state, yet characteristics so as to form a rigid thermoset polymeric mat for the glass fibers when cured. A low binder viscosity in the uncured state is required to allow the mat to be sized correctly. Also, viscous binders tend to be tacky or sticky and hence they lead to accumulation of fiber on the forming chamber walls. This accumulated fiber may later fall onto the mat causing dense areas and product problems. A binder which forms a rigid matrix when cured is required so that a finished fiberglass thermal insulation product, when compressed for packaging and shipping, will recover to its specified vertical dimension when installed in a building.

From among the many thermosetting polymers, numerous candidates for suitable thermosetting fiber-glass binder resins exist. However, binder-coated fiberglass products are often of the commodity type, and thus cost becomes a driving factor, generally ruling out such resins as thermosetting polyurethanes, epoxies, and others. Due to their excellent cost/performance ratio, the resins of choice in the past have been phenol/formaldehyde resins. Phenol/formaldehyde resins can be economically produced, and can be extended with urea prior to use as a binder in many applications. Such urea-extended phenol/formaldehyde binders have been the mainstay of the fiberglass insulation industry for years.

Over the past several decades, however, minimization of volatile organic compound emissions (VOCs) both on the part of the industry desiring to provide a cleaner environment, as well as by Federal regulation, has led to extensive investigations into not only reducing emissions from the current formaldehyde-based binders, but also into candidate replacement binders. For example, subtle changes in the ratios of phenol to formaldehyde in the preparation of the basic phenol/formaldehyde resole resins, changes in catalysts, and addition of different and multiple formaldehyde scavengers, has resulted in considerable improvement in emissions from phenol/formaldehyde binders as compared with the binders previously used. However, with increasing stringent Federal regulations, more and more attention has been paid to alternative binder systems which are free from formaldehyde.

One particularly useful formaldehyde-free binder system employs a binder comprising a polycarboxy polymer and a polyol. Formaldehyde-free resins are those which are not made with formaldehyde or formaldehyde-generating compounds. Formaldehyde-free resins do not emit appreciable levels of formaldehyde during the insulation manufacturing process and do not emit formaldehyde under normal service conditions. Use of this binder system in conjunction with a catalyst, such as an alkaline metal salt of a phosphorous-containing organic acid, results in glass fiber products that exhibit excellent recovery and rigidity properties.

These novel binder systems, however, are best employed at a pH of less than about 3.5, preferably less than 3.0, more preferably less than about 2.5. Variations in pH of as little as 0.3 can result in poor curing of the binder composition. This, in turn, results in glass fiber products which exhibit poor performance upon curing.

pH in these formaldehyde-free binder systems has generally been accomplished by adding a specific amount of acid based solely on the concentration of binder resin percent in the composition. The problem with this system is that it does not take into account the effect on pH of other components such as process water. Owing to the variability of the water used to make up the binder composition, it has been impossible to obtain the degree of pH control desired.

It is desirable to employ a method for measuring the pH of the binder composition sufficiently early in the manufacturing process to allow adjustment of the binder pH to ensure that effective curing can be achieved. The pH control system must be sensitive enough to detect variations in pH of as little as 0.1 and allow adjustments of pH to the same degree.

A feedback mechanism is also desirable whereby the pH of the composition can be adjusted automatically to bring the measured pH within an acceptable range.

BRIEF SUMMARY OF THE INVENTION

The present invention maintains the pH of a formaldehyde-free binder composition within a desired range by measuring the pH of the binder system and adjusting the amount of acid added to the system to bring the pH to within the desired range.

This is accomplished by measuring the pH after acid is added to the binder composition. The measured pH is then compared with a pre-set value. If the measured pH varies from the pre-set by more than 0.2 the rate at which acid is introduced into the binder composition is adjusted to bring the measured pH to within 0.2 units of the pre-set pH. Careful control of the pH of the binder composition results in fewer processing difficulties when preparing fiberglass products and provides excellent physical characteristics.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Figure 1:
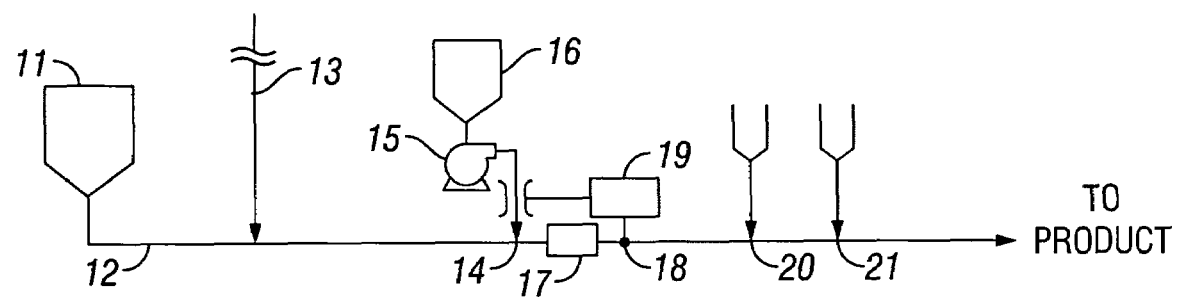
FIG. 1 illustrates a fiberglass forming line with the pH control system of the invention.

Binder composition useful in the formation are prepared by mixing a resin solution with water. The resins typically comprise low molecular-weight poly-carboxy polymers, especially acrylic polymers although other formaldehyde-free resin may also be used. As used herein, the term "formaldehyde-free" means that the resin or binder composition is substantially free of formaldehyde and/or does not liberate formaldehyde as a result of drying or curing. The pH of the mixture is adjusted to a pH of 3.5 or less and additional additives may be introduced. While the binder compositions can be formed in a batch process, it is preferable to form the composition in a continuous process. The invention relates to a method and system for continuously monitoring the pH of the binder composition as it is formed and adjusting the addition of pH control agent to ensure that the composition has a pH with a pre-set specification.

Referring to FIG. 1, a formaldehyde-free resin is introduced from a storage tank 11 to the binder mixing system 12. The resin is then combined with process water coming from a water source 13. Acid is then introduced at point 14 via a pump 15 from a storage tank 16. The mixture then enters a static mixer 17 to ensure thorough mixing of the composition. Following the static mixture, the pH of the composition is measured by a pH probe 18. The measured pH is then relayed to a control system 19 where the measured pH is compared to a pre-set pH standard.

If the measured pH deviates from the pre-set pH by more than a prescribed amount, the control system 19 sends a signal to the acid pump 15 adjusting the rate at which the pump introduces acid into the binder composition.

The formaldehyde-free binders are typically poly-carboxy polymers such as acrylic resins. As used herein, the term formaldehyde-free refers to binder compositions. They generally have a molecular weight of less than about 10,000, preferably less than about 5,000, most preferably less than about 3,000 with about 2,000 being advantageous.

The polycarboxy polymer used in the binder of the present invention comprises an organic polymer or oligomer containing more than one pendant carboxy group. The polycarboxy polymer may be a homopolymer or copolymer prepared from unsaturated carboxylic acids including but not necessarily limited to, acrylic acid, methacrylic acid, crotonic acid, isocrotonic acid, maleic acid, cinnamic acid, 2-methylmaleic acid, itaconic acid, 2-methylitaeonic acid, .alpha., .beta.-methyleneglutaric acid, and the like. Alternative, the polycarboxy polymer may be prepared from unsaturated anhydrides including, but not necessarily limited to, maleic anhydride, methacrylic anhydride, and the like, as well as mixtures thereof. Methods for polymerizing these acids and anhydrides are well-known in the chemical art.

The formaldehyde-free curable aqueous binder composition of the present invention also contains a polyol containing at least two hydroxyl groups. The polyol must be sufficiently nonvolatile such that it will substantially remain available for reaction with the polyacid in the composition during heating and curing operations. The polyol may be a compound with a molecular weight less than about 1000 bearing at least two hydroxyl groups such as, for example, ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, triethanolamine, and certain reactive polyols such as, for example, .beta.-hydroxyalkylamides such as, for example, bis[N,N-di(β-hydroxyethyl)]adipamide, as may be prepared according to the teachings of U.S. Pat. No. 4,076,917, hereby incorporated herein by reference, or it may be an addition polymer containing at least two hydroxyl groups such as, for example, polyvinyl alcohol, partially hydrolyzed polyvinyl acetate, and homopolymers or copolymers of hydroxyethyl (meth) acrylate, hydroxypropyl(meth) acrylate, and the like. The most preferred polyol for the purposes of the present invention is triethanolamine (TEA).

The ratio of the number of equivalents of carboxy, anhydride, or salts thereof of the polyacid to the number of equivalents of hydroxyl in the polyol is from about 1/0.01 to about 1/3. An excess of equivalents of carboxy, anhydride, or salts thereof of the polyacid to the equivalents of hydroxyl in the polyol is preferred. The more preferred ratio of the number of equivalents of carboxy, anhydride, or salts thereof in the polyacid to the number of equivalents of hydroxyl in the polyol is from about 1/0.4 to about 1/1. The most preferred ratio of the number of equivalents of carboxy, anhydride, or salts thereof in the polyacid to the number of equivalents of hydroxyl in the polyol is from about 1/0.6 to about 1/0.8, and most preferably from 1/0.65 to 1/0.75. A low ratio, approaching 0.7:1, has been found to be of particular advantage in the present invention, when combined with a low molecular weight polycarboxy polymer and the low pH binder.

The formaldehyde-free curable aqueous binder composition of the present invention also contains a catalyst. Most preferably, the catalyst is a phosphorous-containing accelerator which may be a compound with a molecular weight less than about 1000 such as, for example, an alkali metal polyphosphate, an alkali metal dihydrogen phosphate, a polyphosphoric acid, and an alkyl phosphinic acid or it may be an oligomer or polymer bearing phosphorous-containing groups such as, for example, addition polymers of acrylic and/or maleic acids formed in the presence of sodium hypophosphite, addition polymers prepared from ethylenically unsaturated monomers in the presence of phosphorous salt chain transfer agents or terminators, and addition polymers containing acid-functional monomer residues such as, for example, copolymerized phosphoethyl methacrylate, and like phosphonic acid esters, and copolymerized vinyl sulfonic acid monomers, and their salts. The phosphorous-containing accelerator may be used at a level of from about 1% to about 40%, by weight based on the combined weight of the polyacid and the polyol. Preferred is a level of phosphorous-containing accelerator of from about 2.5% to about 10%, by weight based on the combined weight of the polyacid and the polyol.

As noted above, the binder composition achieves optimal curing at relatively low pHs, typically less than 3.0, more preferably less than 2.5 and most preferably less than 2.0. The pH of the binder system is typically reduced by the introduction of a pH control agent such as a suitable acid. A proton donor which can reduce the pH of the binder composition to the desired pH range without adversely affecting the binder composition can be used. The acids which are most often used are sulfuric and nitric acid with sulfuric acid preferred.

The rate of acid introduction is carefully controlled so as to ensure a consistent pH in the binder composition. While the pH may be adjusted by any means available, automatic electrical systems are preferred. Typical feed rates range from about 1.5 liters per minute to about 46 liters per minute depending upon such factors as the flow rate of the aqueous binder composition. Feed rates are typically controlled using a variable speed pump such as a Milton Roy Hydraulic Diaphram pump.

Following acid introduction, the binder composition enters a static mixer 6 to ensure proper mixing of the components. Additional components, such as silane, silicone and dedusting oil may be added before the static mixer, however, introduction of these additives upstream of the pH probe 7 may adversely affect the performance of the pH meter. Thus, in one embodiment, introduction of additives 8, 9 other than acid occurs downstream of the pH probe.

Two or more pH probes may be used as part of the system to ensure continuous pH monitoring in the system. Use of redundant pH sensor allows continuous operation even if one sensor becomes foiled or otherwise becomes inoperative. While any pH sensor capable of in-line pH monitoring may be employed, it is preferable to use a non-glass pH sensor such as IsFet pH sensor manufactured by Endress+Hauser.

The pH probe may also be equipped with automatic cleaning and calibration systems such as the Endress and Hauser TopCal systems. Use of automated calibration cleaning systems ensures accurate pH readings without the need for a complete system shutdown to clean and calibrate the sensor. The presence of an automated cleaning system is particularly useful where the pH sensor is placed downstream of the point where additives are introduced into the binder system.

As discussed, the pH measured by the pH probe 7 is then relayed to a control unit 8. The measurement is typically relayed by an electrical system however, any manner of transferring data may be employed. In the case of an electrical system, the probe 7 relays a signal representing the measured pH to the control unit 8. The control unit then interprets the signal and compares the measured pH with a pre-set value. The control unit 8 can be any system capable of comparing the measured pH with the pre-set pH value and then causes a change in the rate of acid addition. Manual, mechanical or electronic systems can be employed. In practice, a PID system has proven effective in controlling the pH of the solution; however, other automatic systems can be used.

The preset value for the system ranges from a pH of about 3.5 to about 2.0 preferably from about 3.0 to about 2.5. These values will depend, in part, on the specific, formaldehyde-free binders used to coat the fibers. If the measured pH deviates from the pre-set value by more than a prescribed range, the control unit causes the rate and is added into the composition to increase or decrease depending on whether the pH is being decreased or increased.

Adjustments of pH is generally accomplished by increasing or decreasing the rate at which acid is added to the aqueous binder composition. For example, to lower pH, the rate of acid flow is increased and to raise the pH the rate of acid flow is increased. While control of pH by means of acid addition is preferred, other methods known to those skilled in the art can be employed. For example, to increase the pH, a base solution can be added to the composition. Similarly, to decrease the pH, a second acid may be used in combination with the first.

In practice, it has been found that variation of as either in 0.3 pH units can affect the final cure of the product. For this reason, it is preferable to limit the allowable deviation in pH to ±0.2 units more preferably ±0 to ±1.0 most preferably ±0.05.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method of controlling the pH of a formaldehyde-free aqueous binder composition comprising:

preparing a mixture of a formaldehyde-free resin and water;

adding a pH control agent to the mixture;

measuring the pH of the mixture after the addition of pH control agent;

electrically relaying the pH measurement to a PID system;

comparing the measured pH with a pre-set pH value;

adjusting the amount of pH control agent added to the mixture when the measured pH varies from the pre-set pH value by ± about 0.3 pH units such that the pH value of the mixture equals the pre-set pH value ± about 0.3 pH units and where the preset pH value is less than or equal to about 3.5, wherein the formaldehyde-free aqueous resin further comprises more than one acidic functional groups selected from the group consisting of carboxy, anhydride, carboxy salts and anhydride salts, wherein the formaldehyde-free aqueous binder composition further comprises a polyol having at least two hydroxyl groups, wherein the ratio of acidic functional groups to hydroxyl groups ranges from about 1:1.1 to 1:3.

2. The method of claim 1 wherein the pH control agent is an acid.

3. The method of claim 2 wherein said acid is sulfuric acid.

4. The method of claim 1 wherein the measured pH is determined using a pH meter.

5. The method of claim 1 wherein the formaldehyde-free resin comprises a poly-carboxy polymer.

6. A method for controlling the pH of a formaldehyde-free aqueous binder composition comprising:

preparing a mixture of a formaldehyde-free resin and water;

adding pH control agent to the mixture;

measuring the pH of the mixture after addition of acid;

electrically relaying the pH measurement to a PID system;

comparing the measured pH with a pre-set pH value;

adjusting the amount of pH control agent added to the mixture if the measured pH deviates from the pre-set pH ± about 0.3 pH units and where the pre-set pH value is less than or equal to 3.5 wherein the formaldehyde-free aqueous resin further comprises more than one acidic functional groups selected from the group consisting of carboxy, anhydride, carboxy salts and anhydride salts, wherein the formaldehyde-free aqueous binder composition further comprises a polyol having at least two hydroxyl groups, wherein the ratio of acidic functional groups to hydroxyl groups ranges from about 1:1.1 to 1:3.

7. The method of claim 6 wherein the pH control agent is an acid.

8. The method of claim 6 wherein the pre-set pH ranges from 3.5 to 2.5

* * * * *